US012678927B2

(12) United States Patent
Liu, Jr. et al.

(10) Patent No.: US 12,678,927 B2
(45) Date of Patent: Jul. 14, 2026

(54) HANDHELD ELECTRIC TOOL AND MOTOR ASSEMBLY FOR ELECTRIC TOOL

(71) Applicant: TECHTRONIC CORDLESS GP, Anderson, SC (US)

(72) Inventors: Jie Liu, Jr., Dongguan (CN); Zhigang Peng, Guangdong (CN); Hua Fan, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 351 days.

(21) Appl. No.: 17/948,672

(22) Filed: Sep. 20, 2022

(65) Prior Publication Data

US 2023/0087479 A1 Mar. 23, 2023

(30) Foreign Application Priority Data

Sep. 22, 2021 (CN) .......................... 202111106994.1

(51) Int. Cl.
B25F 5/00 (2006.01)
B27G 19/00 (2006.01)
(Continued)

(52) U.S. Cl.
CPC ............ B25F 5/008 (2013.01); B27G 19/003 (2013.01); H02K 5/207 (2021.01); H02K 5/24 (2013.01);
(Continued)

(58) Field of Classification Search
None
See application file for complete search history.

(56) References Cited

U.S. PATENT DOCUMENTS 2,990,858 A 7/1961 Ledger
4,193,193 A 3/1980 Holzworth
(Continued)

FOREIGN PATENT DOCUMENTS

AU 769254 B2 1/2004
AU 2011221378 A1 9/2011
(Continued)

OTHER PUBLICATIONS

English translation of CN-105099041-A, publication date Nov. 25, 2015.*

(Continued)

*Primary Examiner* — Hwei-Siu C Payer
(74) *Attorney, Agent, or Firm* — Dority & Manning, P.A.

(57) ABSTRACT

The present invention provides a handheld electric tool and a motor assembly for a handheld electric tool. The handheld electric tool of the present invention comprises a housing, a working member, a motor and a motor support. The motor support comprises a first part positioned at a far-side end of the motor and fixedly connected to the housing, and a second part extending from the first part into the interior of the motor and fixedly connected to a stator of the motor. The second part is provided with a first through-hole for a rotor shaft of the motor to pass through, and an output end of the rotor shaft extends through the first through-hole and drives the working member to move. The handheld electric tool provided in the present invention can prevent excessive transmission of motor vibration to the housing, and can pump fluid through the motor to cool components in the housing. Furthermore, the motor assembly of the present invention has an ingenious layout, making the machine as a whole smaller and more lightweight.

25 Claims, 10 Drawing Sheets

(51) Int. Cl.

| | |
|---|---|
| *H02K 5/20* | (2006.01) |
| *H02K 5/24* | (2006.01) |
| *H02K 7/08* | (2006.01) |
| *H02K 7/14* | (2006.01) |
| *H02K 9/06* | (2006.01) |
| *H02K 11/33* | (2016.01) |
| *B23D 57/02* | (2006.01) |

(52) U.S. Cl.
CPC ............. *H02K 7/085* (2013.01); *H02K 7/145* (2013.01); *H02K 9/06* (2013.01); *H02K 11/33* (2016.01); *B23D 57/023* (2013.01); *B25F 5/006* (2013.01); *H02K 2211/03* (2013.01)

(56) References Cited

U.S. PATENT DOCUMENTS

| | | | |
|---|---|---|---|
| 4,807,366 | A | 2/1989 | Masato et al. |
| 4,819,335 | A | 4/1989 | Alexander |
| 4,841,641 | A | 6/1989 | Laidlaw |
| 4,887,357 | A | 12/1989 | Alexander |
| 5,491,899 | A | 2/1996 | Schliemann et al. |
| 5,522,143 | A | 6/1996 | Schliemann et al. |
| 5,685,080 | A | 11/1997 | Amano et al. |
| D389,026 | S | 1/1998 | Amano et al. |
| 6,014,812 | A * | 1/2000 | Webster ................. A01D 34/78 |
| | | | 30/276 |
| 6,532,671 | B1 | 3/2003 | Jong |
| 6,564,459 | B1 | 5/2003 | Steinbrueck et al. |
| 7,107,689 | B2 | 9/2006 | Keeton et al. |
| 7,155,832 | B2 | 1/2007 | Warfel et al. |
| 7,287,330 | B1 | 10/2007 | Riha |
| 7,600,323 | B2 | 10/2009 | Sugishita |
| 7,690,407 | B2 | 4/2010 | Annala |
| 7,743,513 | B1 | 6/2010 | Fisher et al. |
| D631,314 | S | 1/2011 | Baxter |
| 8,065,805 | B2 | 11/2011 | Stones et al. |
| 8,136,254 | B2 | 3/2012 | Gieske et al. |
| 8,286,359 | B2 | 10/2012 | Ashfield |
| 8,365,420 | B2 | 2/2013 | Pellenc |
| 8,434,236 | B2 | 5/2013 | Pellenc |
| 8,495,819 | B2 | 7/2013 | Okouchi |
| 8,595,943 | B2 | 12/2013 | Buttery et al. |
| 8,672,162 | B2 | 3/2014 | Okouchi |
| 9,132,568 | B2 | 9/2015 | Peterson |
| 9,138,912 | B2 | 9/2015 | Kapinsky et al. |
| 9,636,840 | B2 | 5/2017 | Saitoh |
| 9,669,563 | B2 | 6/2017 | Lee |
| 9,676,115 | B2 | 6/2017 | Takayanagi et al. |
| 9,713,880 | B2 | 7/2017 | Haneda et al. |
| 9,713,881 | B2 | 7/2017 | Zimmermann et al. |
| 9,717,185 | B2 | 8/2017 | Stones et al. |
| 10,434,682 | B2 | 10/2019 | Bonomi |
| 10,537,983 | B2 | 1/2020 | Dyer et al. |
| 10,814,518 | B2 | 10/2020 | Gerstenberger et al. |
| D906,779 | S | 1/2021 | Tinius |
| 10,882,206 | B2 | 1/2021 | McRoberts et al. |
| D932,268 | S | 10/2021 | Fang |
| D957,225 | S | 7/2022 | Song |
| D959,945 | S | 8/2022 | Lin |
| D977,932 | S | 2/2023 | Paunovic |
| 2004/0098869 | A1 | 5/2004 | Ashfield |
| 2006/0230900 | A1 | 10/2006 | Bergquisto |
| 2009/0241353 | A1 | 10/2009 | Ericson et al. |
| 2011/0005088 | A1 | 1/2011 | Pellenc |
| 2011/0162219 | A1 | 7/2011 | Okouchi |
| 2012/0118595 | A1 | 5/2012 | Pellenc |
| 2012/0174416 | A1 | 7/2012 | Nelson, II |
| 2012/0313464 | A1 * | 12/2012 | Fukuoka ............... H02K 7/145 |
| | | | 83/491 |
| 2013/0345003 | A1 | 12/2013 | Maag et al. |
| 2014/0047722 | A1 | 2/2014 | Onose et al. |
| 2014/0115905 | A1 | 5/2014 | Han |
| 2015/0135542 | A1 | 5/2015 | Cook |
| 2016/0039110 | A1 | 2/2016 | Schiedt et al. |
| 2017/0197262 | A1 * | 7/2017 | Kume ................... B23D 45/16 |
| 2017/0239835 | A1 | 8/2017 | Ebner |
| 2017/0282120 | A1 * | 10/2017 | Uramoto ........... B01J 20/28033 |
| 2017/0294819 | A1 | 10/2017 | Crosby et al. |
| 2018/0084731 | A1 | 3/2018 | Harris |
| 2018/0133818 | A1 | 5/2018 | Mang et al. |
| 2018/0193932 | A1 | 7/2018 | Gall |
| 2019/0357446 | A1 | 11/2019 | McCue et al. |
| 2019/0366580 | A1 | 12/2019 | Lu |
| 2020/0223090 | A1 | 7/2020 | Osawa et al. |
| 2020/0306847 | A1 | 10/2020 | Osawa et al. |
| 2020/0398417 | A1 | 12/2020 | Osawa et al. |
| 2021/0050766 | A1 | 2/2021 | Lee et al. |
| 2021/0078123 | A1 | 3/2021 | Oberhofer et al. |
| 2021/0114249 | A1 | 4/2021 | Li |
| 2021/0154879 | A1 | 5/2021 | McCue et al. |
| 2021/0162622 | A1 | 6/2021 | Cao et al. |
| 2021/0259167 | A1 * | 8/2021 | Wang ................... F04D 29/703 |
| 2023/0087479 | A1 * | 3/2023 | Liu, Jr. ................... H02K 9/06 |
| | | | 30/382 |
| 2023/0356310 | A1 * | 11/2023 | Jubeck ................. B23D 49/16 |

FOREIGN PATENT DOCUMENTS

| | | | | | |
|---|---|---|---|---|---|
| CA | 1106264 | A | | 8/1981 | |
| CN | 102101084 | B | | 6/2011 | |
| CN | 105099041 | A | * | 11/2015 | ............. H02K 1/185 |
| CN | 109877917 | A | | 6/2019 | |
| CN | 211030357 | U | | 7/2020 | |
| CN | 211362619 | U | | 8/2020 | |
| CN | 211362622 | U | | 8/2020 | |
| CN | 212287976 | U | | 1/2021 | |
| CN | 212368051 | U | | 1/2021 | |
| CN | 112339021 | A | | 2/2021 | |
| CN | 213044275 | U | | 4/2021 | |
| CN | 213320571 | U | | 6/2021 | |
| DE | 202005001674 | U1 | | 4/2005 | |
| DE | 202015004337 | U1 | | 10/2015 | |
| DE | 202015106227 | U1 | | 11/2015 | |
| DE | 102019121221 | A1 | | 2/2021 | |
| EP | 1764197 | A2 | | 3/2007 | |
| EP | 2492070 | A1 | | 8/2012 | |
| EP | 4186665 | A1 | | 5/2023 | |
| JP | 2002210705 | A | | 7/2002 | |
| JP | 2023523118 | A | * | 6/2023 | ............. B06B 1/16 |
| WO | WO2012/144942 | A1 | | 10/2012 | |
| WO | WO2022048532 | A1 | | 3/2022 | |
| WO | WO-2024195279 | A1 | * | 9/2024 | ............... B25F 5/02 |

OTHER PUBLICATIONS

English translation of WO-2024195279-A1, dated Sep. 26, 2024.*
English translation of JP-2023523118-A, dated Jun. 2, 2023.*
European Search Report Corresponding with Application No. EP23167381 Aug. 8, 2023 (1 page).
European Search Report Corresponding with Application No. EP22194102 on Mar. 27, 2023 (2 pages).

* cited by examiner

HANDHELD ELECTRIC TOOL AND MOTOR ASSEMBLY FOR ELECTRIC TOOL

This application claims the benefit of priority to Chinese Patent Application No. CN 202111106994.1, filed on Sep. 22, 2021, the disclosure of which is incorporated by reference herein in its entirety.

TECHNICAL FIELD

The present invention relates to the field of small industrial appliances, in particular to a handheld electric tool. The present invention further relates to a motor assembly for a handheld electric tool.

BACKGROUND ART

Motor-driven handheld tools commonly seen on the market nowadays have some shortcomings with regard to motor arrangement, ventilation and cooling, etc. Taking handheld trimmers as an example, in a conventional handheld trimmer the motor is generally engaged directly with ribs in the casing. Such an arrangement might result in motor vibration being transmitted directly to the housing, and because the user needs to grip the housing to carry out jobs, this will result in the user having a poor tactile experience.

Furthermore, in a conventional design, the axis of the motor is generally parallel to the axis of the housing region in which it is situated (the housing region that accommodates the motor is generally a regular structural body). As a result, the motor takes up a lot of space, and the gaps between the motor and the surrounding housing are all small, so cannot be used to position other structures. Thus, in order to accommodate other structures in the housing, the only option is to increase the size of the overall structure of the trimmer, which is consequently not sufficiently lightweight.

With regard to ventilation and cooling, some existing trimmers do not provide ventilation and cooling functionality. Although some other trimmers take cooling needs into account, it is necessary to provide a special mechanism to guide the entry of airflow for cooling the internal structure. This makes the internal structure of the trimmer complex, and increases the production cost.

There are also some trimmers in which the guard for the cutting blades or cutting saw is not engaged securely enough to the casing, so can easily fall off the casing; or the engagement between the guard and the casing is not agile enough, so the user needs to open the guard manually in order to carry out a job.

Thus, there is a need to provide a handheld electric tool and a motor assembly for same, in order to at least partially solve the abovementioned problems.

SUMMARY OF THE INVENTION

An objective of the present invention is to provide a handheld electric tool and a motor assembly for an electric tool. In a first aspect of the present invention, a motor support for installing a motor is designed; the motor support is used to fix the motor in a housing, and can prevent excessive transmission of motor vibration to the housing. In another aspect of the present invention, the motor itself and a corresponding position of the housing are provided with technical measures to facilitate ventilation and cooling, such that when the motor is operating, airflow can be sucked into the interior of the housing and cool internal components of the housing, and cold airflow being sucked in cannot easily mix with hot airflow that has flowed through the motor. In another aspect of the present invention, the motor is arranged such that an axis thereof deviates from an axis of a housing region in which it is situated, and an angle between the motor axis and the axis of the housing region may preferably be set to make it easier to provide a PCB close to the motor, so that the structure of the machine as a whole is smaller and more lightweight. In another aspect of the present invention, the engagement between a guard of a working member and the housing is both secure and flexible, such that the guard cannot easily fall off the housing, and allows the guard to be pushed up naturally by a target object during a job, with no need for the user to open the guard manually.

According to one aspect of the present invention, a handheld electric tool is provided, comprising:

a housing, provided with an installation opening;

a working member, installed at the installation opening of the housing and protruding outward from the housing;

a motor disposed in the housing, the motor having a far-side end close to the working member and a near-side end remote from the working member;

a motor support, disposed in the housing and comprising:

a first part, positioned at the far-side end of the motor and fixedly connected to the housing, a second part, extending from the first part into the interior of the motor and fixedly connected to a stator of the motor, wherein the second part is provided with a first through-hole for a rotor shaft of the motor to pass through, and an output end of the rotor shaft extends through the first through-hole and drives the working member to move.

In one embodiment, the first part of the motor support is formed as a plate-like structure, which preferably comprises a circular plate and at least two wing plates extending from the circular plate, and an engagement slot is provided in an inner wall of the housing, the plate-like structure being correspondingly held in the engagement slot.

In one embodiment, the motor is an external-rotor motor, and the second part is formed as a tubular structure engaged with a circumferential inner wall of the stator, the tubular structure defining the first through-hole.

According to the solutions above, the motor support can fix the motor securely in the housing, and can prevent excessive transmission of motor vibration to the housing.

In one embodiment, one end of a rotor of the motor is provided with a rotation conduction component arranged around the rotor shaft, the rotation conduction component being connected to both the rotor shaft and a body of the rotor in such as way as to be incapable of relative rotation, and preferably having multiple fan blades arranged around the rotor shaft.

In one embodiment, a bearing is installed in the first through-hole, the bearing supporting the rotor shaft rotatably.

In one embodiment, a nearest-end part and a farthest-end part in the first through-hole are each provided with one said bearing.

In one embodiment, the rotor shaft comprises a near-side extremity extending out of a body of the motor, at least one bearing being installed at the near-side extremity, the at least one bearing preferably being installed in an engagement slot of the housing.

According to the solutions above, further vibration reduction can be achieved, high-speed rotation of the rotor shaft can be prevented from causing wear to components adjacent thereto, and resistance encountered by the rotor shaft when rotating can be reduced.

In one embodiment, the housing is provided with a gas inlet close to the far-side end and a gas outlet close to the near-side end, and the motor is configured such that during operation thereof, airflow can be sucked in through the gas inlet, flow through the motor and finally be discharged through the gas outlet, driven by the rotary action of the fan blades, and preferably, a separating rib for hermetically separating the gas inlet and the gas outlet is provided in the housing, the separating rib being positioned at the far-side end of the motor or between the far-side end and the gas outlet.

In one embodiment, a path of extension of the separating rib in the housing is formed in a U-shape, the recess of the U-shape facing towards the near-side end of the motor, and the motor support being accommodated in the recess in a size-fitted manner.

In one embodiment, the gas inlet is positioned at the side of the first part of the motor support that faces away from the motor, and the first part is provided with multiple second through-holes which run through the first part in a direction parallel to the rotor shaft.

In one embodiment, the handheld electric tool further comprises a PCB which is disposed in the housing and close to the motor, the gas inlet being positioned so as to be simultaneously close to the PCB, so that sucked-in gas flows through the PCB and then through the motor.

According to the solutions above, when the motor is operating, airflow can be sucked into the interior of the housing and cool internal components of the housing, and cold airflow being sucked in cannot easily mix with hot airflow that has flowed through the motor.

In one embodiment, the housing comprises a motor region for accommodating the motor and a gripping region for a user to grasp, the motor region being an axially symmetric structural body, wherein an axial direction of the rotor shaft of the motor deviates from an axis of symmetry of the motor region.

In one embodiment, an angle between the axial direction of the rotor shaft of the motor and the axis of symmetry of the motor region is 10°-60°.

In one embodiment, the motor region of the housing has a characteristic housing part parallel to the axis of symmetry, the distance between the characteristic housing part and the near-side end of the motor being less than the distance between the characteristic housing part and the far-side end of the motor, and the handheld electric tool comprises a PCB, the PCB being positioned so as to be partially located between a supporting member of the motor and the characteristic housing part.

In one embodiment, the housing further comprises a central region, wherein the motor region, the gripping region and the working member are arranged so as to extend outwards around the central region, and a transmission mechanism for transmitting an output of the motor to the working member is provided in the central region.

According to the solutions above, components such as the PCB can be disposed close to the motor more easily, the internal layout of the housing is rational, and the overall structure of the electric tool can be made smaller and more lightweight.

In one embodiment, the handheld electric tool is a handheld trimming device, in particular a chainsaw; and the working member is a cutting member, in particular comprising a saw chain.

In one embodiment, the handheld electric tool further comprises a guard which projects from the housing and partially covers the working member, and the housing has a pair of clamping structures located at the opening, the guard being pivotably clamped between the pair of clamping structures.

In one embodiment, the handheld electric tool is configured to enable the guard to freely pivot away from the working member relative to the pair of clamping structures, so as to allow the guard to be pushed up by an operation target object during operation of the handheld electric tool.

According to the solutions above, the engagement between the guard of the working member and the housing is both secure and flexible, such that the guard cannot easily fall off the housing, and allows the guard to be pushed up naturally by a target object during a job, with no need for the user to open the guard manually.

According to another aspect of the present invention, a motor assembly for a handheld electric tool is provided, comprising:

a motor, having a far-side end close to a motive power output end and a near-side end remote from the motive power output end;

a motor support, comprising:

a first part, positioned at the far-side end of the motor and comprising at least one fixed characteristic, a second part, extending from the first part into the interior of the motor and fixedly connected to a stator of the motor, wherein the second part is provided with a first through-hole for a rotor shaft of the motor to pass through, the rotor shaft passing through the first through-hole, and a far-side extremity and a near-side extremity of the rotor shaft both extending out of a body of the motor assembly.

In one embodiment, the first part of the motor support is formed as a plate-like structure, which preferably comprises a circular plate and at least two wing plates extending from the circular plate.

In one embodiment, the motor is an external-rotor motor, and the second part is formed as a tubular structure engaged with a circumferential inner wall of the stator, the tubular structure defining the first through-hole.

According to the solutions above, the motor support can fix the motor securely in the housing, and can prevent excessive transmission of motor vibration to the housing.

In one embodiment, one end of a rotor of the motor is provided with a rotation conduction component arranged around the rotor shaft, the rotation conduction component being connected to both the rotor shaft and a body of the rotor in such as way as to be incapable of relative rotation, and preferably having multiple fan blades arranged around the rotor shaft.

In one embodiment, a bearing is installed in the first through-hole, the bearing supporting the rotor shaft rotatably.

In one embodiment, a nearest-end part and a farthest-end part in the first through-hole are each provided with one said bearing.

In one embodiment, at least one bearing is installed on the near-side extremity of the rotor shaft that projects from a body of the motor.

According to the solutions above, further vibration reduction can be achieved, high-speed rotation of the rotor shaft can be prevented from causing wear to components adjacent thereto, and resistance encountered by the rotor shaft when rotating can be reduced.

In one embodiment, the first part of the motor support comprises at least one through-hole.

The solution above allows airflow to be sucked in through the far-side end of the motor assembly, and the sucked-in airflow can be used to cool the motor assembly and other components close to the motor assembly.

BRIEF DESCRIPTION OF THE DRAWINGS

To better understand the above and other objectives, features, advantages and functions of the present invention, the preferred embodiments shown in the drawings may be referred to. In the drawings, identical reference labels denote identical components. Those skilled in the art should understand that the drawings are intended to illustrate preferred embodiments of the present invention schematically, and have no limiting effect on the scope of the present invention, and the various components in the drawings are not drawn to scale.

KEY TO DRAWINGS

Figure 1:
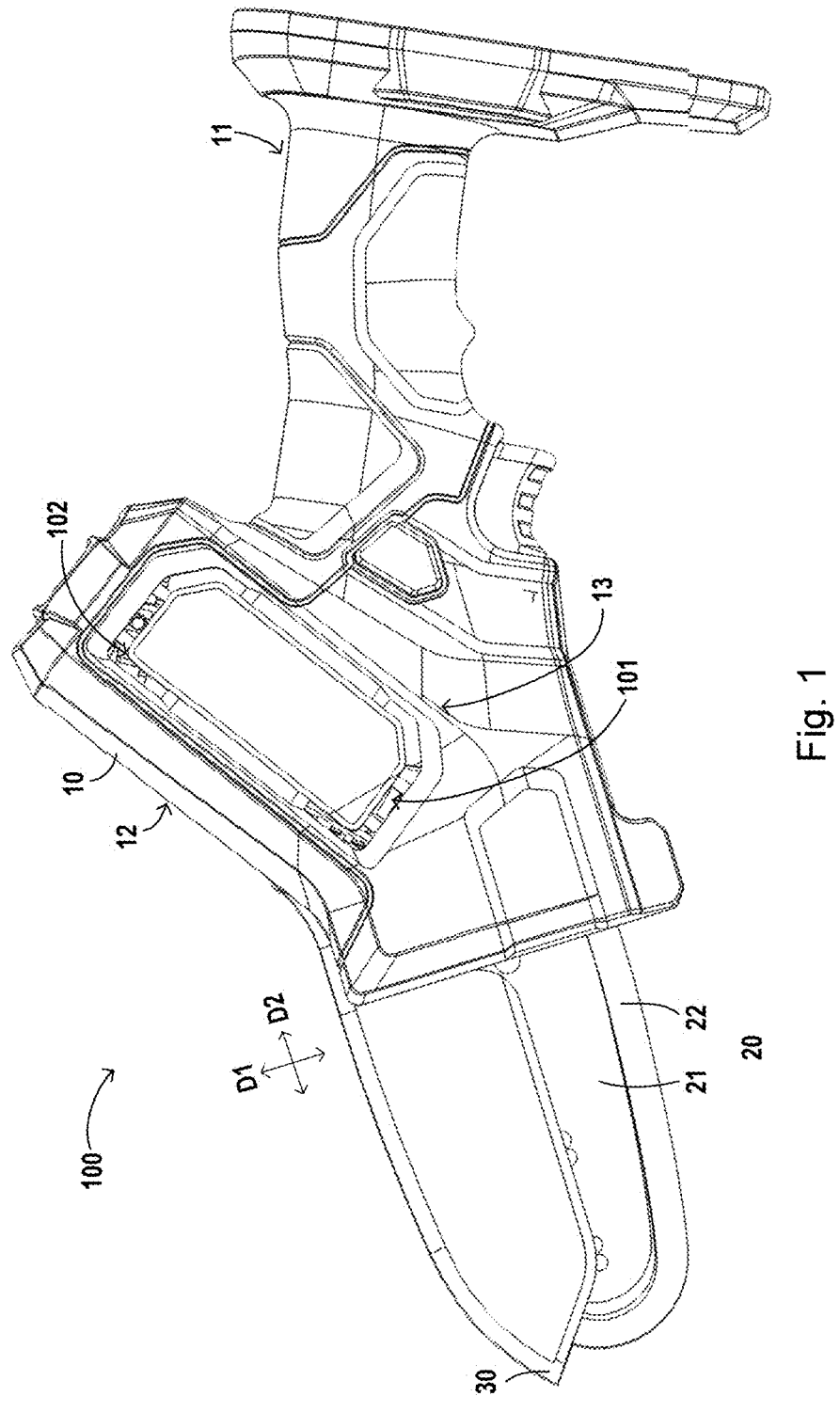
FIG. 1 is a front view of a handheld electric tool according to a preferred embodiment of the present invention.

100 handheld electric tool
10 housing
101 gas inlet
102 gas outlet
103 clamping structure
104 separating rib
11 gripping region
12 motor region
12 characteristic housing part
13 central region
20 working member
21 carrying body
22 saw chain
30 guard
40 motor
41 motor casing
42 rotation conduction component

42a rotor shaft through-hole
421 fan blade
422 tooth
431 first bearing
432 second bearing
433 third bearing
44 output end
45 rotor shaft
451 near-side extremity of rotor shaft
46 body of rotor
47 rotor
50 motor support
51a first through-hole
51b second through-hole
51 first part
511 circular plate
512 wing plate
52 second part
60 transmission mechanism
70 PCB
71 heat dissipating plate
X1 motor axis
X2 axis of symmetry of housing motor region
D far-side direction
P near-side direction
C circumferential direction

DETAILED DESCRIPTION OF EMBODIMENTS

Particular embodiments of the present invention are now described in detail with reference to the drawings. The embodiments described here are merely preferred embodiments of the present invention. Based on these preferred embodiments, those skilled in the art will be able to think of other ways in which the present invention could be implemented, all of which likewise fall within the scope of the present invention.

FIGS. 1-9 show preferred embodiments of a handheld electric tool and a motor assembly according to the present invention. The handheld electric tool of the present invention may for example be a handheld trimming device or a handheld cutting device. It must first be explained that directional and positional terms in the present invention should be understood as meaning relative directions and positions rather than absolute directions and positions. The directional and positional terms in the present invention may be explained with reference to the exemplary structures shown in FIGS. 1-9. For example, the axial direction of the motor mentioned in the present invention is the direction extending along a rotor shaft thereof, e.g. may be understood to be direction X1 shown in FIGS. 3-9; and the circumferential direction and rotation direction are the circumferential direction around the motor axis, e.g. may be understood to be direction C in FIGS. 4-9.

Figure 2:
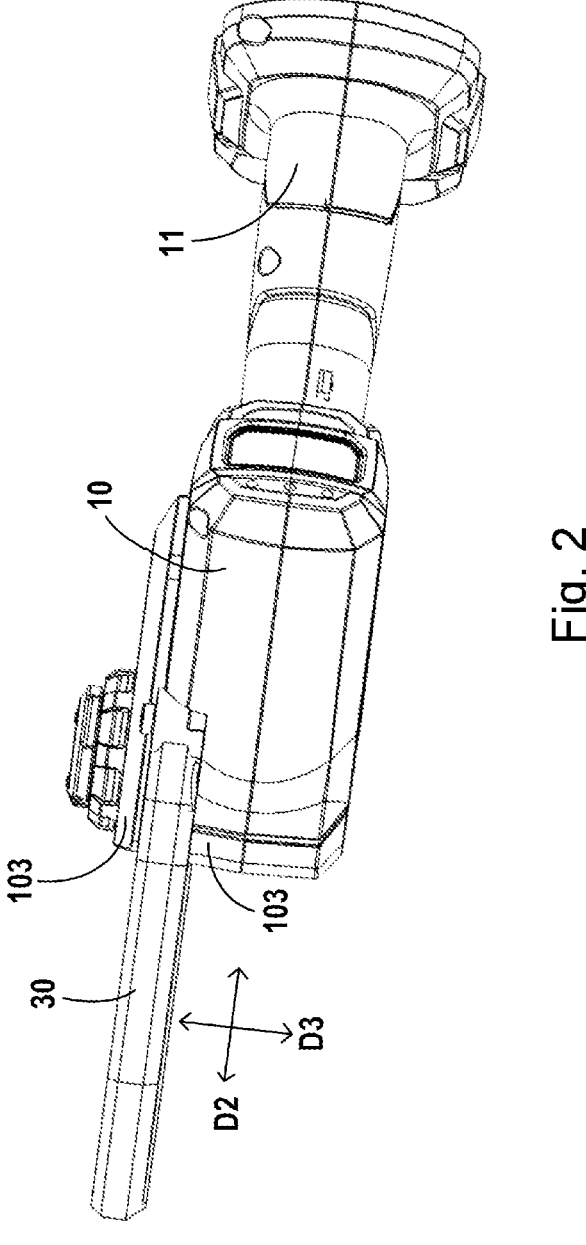
FIG. 2 is a top view of the handheld electric tool in FIG. 1.
Figure 3:
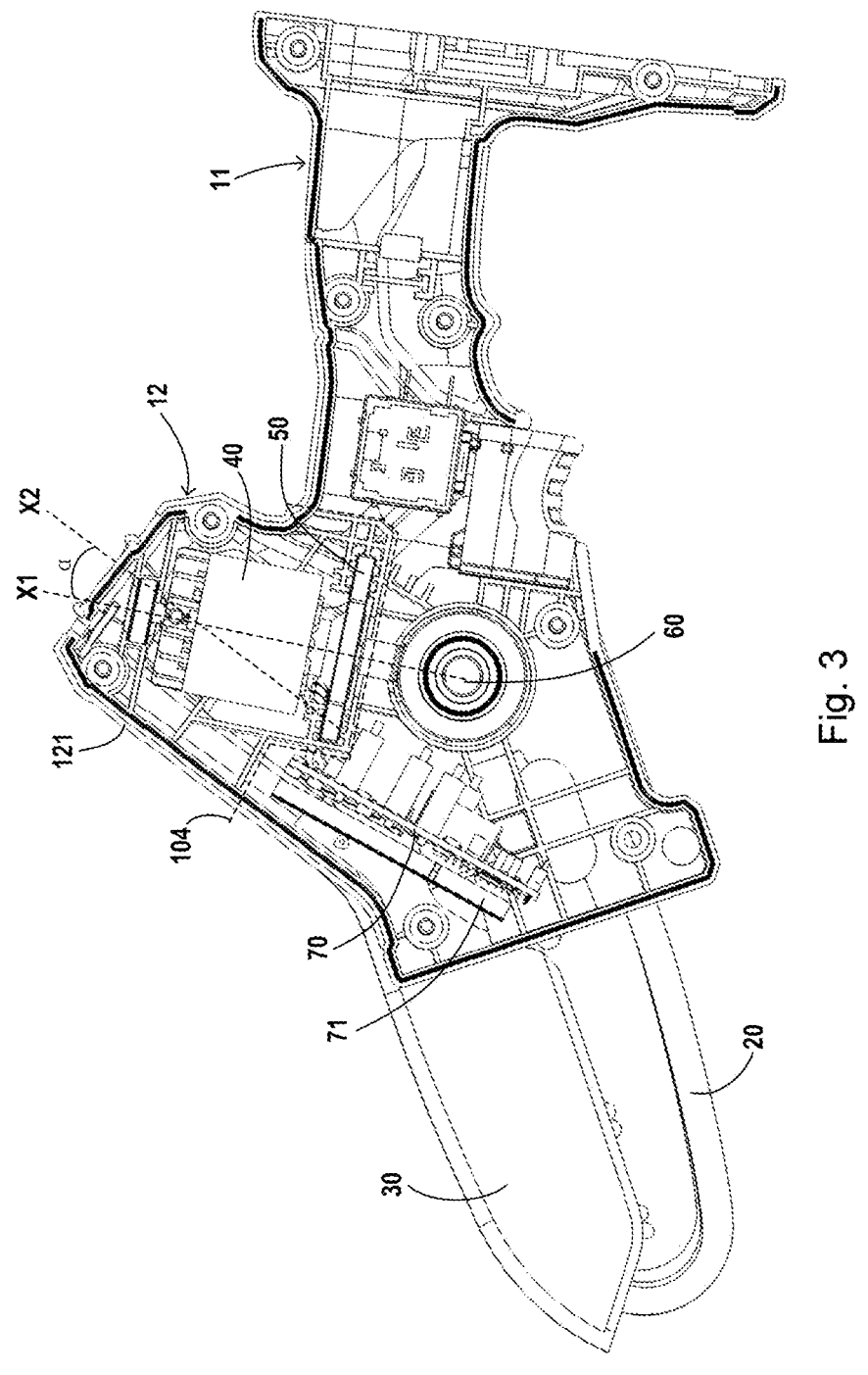
FIG. 3 is a schematic drawing of the handheld electric tool in FIG. 1 with part of the housing removed, showing part of the internal structure of the handheld electric tool.
Figure 4:
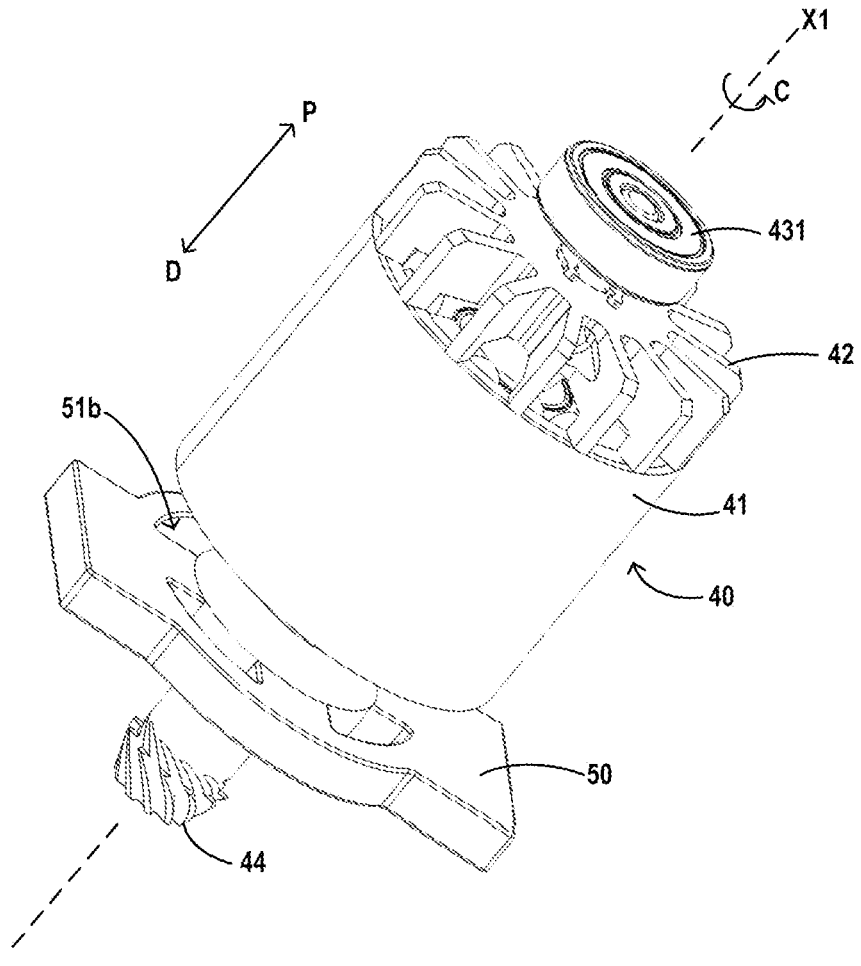
FIG. 4 is a three-dimensional schematic drawing of the combination of the motor and the motor support in FIG. 3.

Referring to FIGS. 1-3 first, the handheld electric tool 100 in this embodiment comprises a housing 10 and a working member 20, with a motor 40 accommodated in the housing 10. The housing 10 is provided with an installation opening; the working member 20 is installed at the installation opening and protrudes outward from the housing 10. The housing 10 comprises a gripping region 11 for a user to grasp, a motor region 12 for accommodating the motor 40, and a central region 13 located at a substantially central position of the handheld electric tool 100. As shown in FIGS. 1 and 3, in this embodiment, the motor region 12, the gripping region 11 and the working member 20 extend outwards substantially from the central region 13.

Continuing to refer to FIG. 3, in this embodiment, the handheld electric tool 100 comprises components accommodated in the housing 10, such as a motor assembly, a PCB 70 and a transmission mechanism 60, and the motor assembly further comprises the motor 40 and a motor support 50. FIGS. 4-9 show specific structures of the motor 40 and the motor support 50. A far-side direction relating to the motor 40 in the figures is shown by direction arrow D, while a near-side direction is shown by direction arrow P.

Referring to FIG. 3, a body of the motor 40 has a far-side end close to the working member 20 and a near-side end remote from the working member 20. Now referring to FIGS. 4 and 5, the end of the body of the motor 40 in the far-side direction D is the far-side end of the motor 40, and the end of the body of the motor 40 in the near-side direction P is the near-side end of the motor 40. A far-side extremity of a rotor shaft 45 of the motor 40 extends out of the motor body structure and is configured as an output end 44 of the motor 40; a near-side extremity 451 of the rotor shaft 45 (see FIG. 8A) extends out of the body structure of the motor 40, and a bearing is installed at the protruding near-side extremity 451 of the rotor shaft 45, this bearing being referred to as a first bearing 431. The rotor shaft 45 is rotatably installed in the housing 10 by the first bearing 431. Preferably, the first bearing 431 is received in an engagement slot formed in a housing inner wall.

The motor support 50 fixes the motor 40 in the housing 10. Specifically, as can be seen from the schematic drawing of the motor support 50 shown in FIG. 7, the motor support 50 is a single-piece member, comprising a first part 51 and a second part 52. The first part 51 may be positioned at the far-side end of the motor 40 and fixed relative to the housing 10, wherein the part that is fixed relative to the housing 10 may be called a fixed characteristic. The second part 52 may extend from the first part 51 into the interior of the motor 40 in the near-side direction P; here, the motor is an external-rotor motor, and the second part 52 is fixed to a stator in the interior of the motor 40. Moreover, as can be seen from FIGS. 3-5, the second part 52 of the motor support is provided with a first through-hole 51a for the rotor shaft 45 of the motor 40 to pass through. The output end 44 of the rotor shaft 45 extends through the first through-hole 51a, and acts on the working member 20 directly or indirectly, to drive the working member 20 to move and thereby perform jobs such as trimming or cutting. That is to say, while the rotor shaft 45 of the motor 40 passes through the first through-hole 51a, the far-side extremity and the near-side extremity 451 of the rotor shaft 45 both extend out of a body of the motor assembly along the motor axis X1. The body of the motor assembly comprises the body of the motor 40 and the motor support 50.

The motor 40 is fixed relative to the housing 10 by means of the motor support 50; this can prevent excessive transmission of vibration of the motor 40 to the housing 10. In this embodiment, the motor support 50 has some preferred structural configurations. For example, referring to FIGS. 7-9, the first part 51 of the motor support 50 in this embodiment is formed as a plate-like structure, while the second part 52 is a tubular structure. The plate-like structure of the first part 51 further comprises a circular plate 511, and two wing plates 512 arranged symmetrically with respect to the circular plate 511. Preferably, the circular plate 511 and the motor 40 are coaxially arranged, and the diameter of the circular plate 511 is the same as the outer diameter of the motor 40. Moreover, as shown in FIG. 3, an engagement slot is provided in an inner wall of the housing 10, and the first part 51 is correspondingly held in the engagement slot, thereby fixing the motor support 50 relative to the housing 10.

As the motor is an external-rotor motor, a body 46 of the rotor is located at the radial periphery of the stator and rotates around the stator. The second part 52 of the motor support 50 in this embodiment is especially suitable for such an external-rotor motor; the second part 52 can extend into the interior of the motor 40 and engage tightly with an inside wall of the stator. The second part 52 is preferably a tubular structure, having openings at both ends so that the first through-hole 51a for the rotor shaft 45 to pass through is defined by the tubular structure.

More preferably, in this embodiment, the first part 51 of the motor support 50 is provided with one or more second through-holes 51b for airflow to pass through. Multiple second through-holes 51b may extend in the circumferential direction C with respect to the rotor shaft 45, in a uniform arrangement. It will be understood that the first through-hole 51a and the second through-hole 51b both run through the motor support 50 in a direction parallel to the motor axis X1. The airflow through the second through-hole 51b is mainly used to cool electronic or mechanically moving components in the housing 10; a discussion concerning the airflow will be laid out in detail below.

Figure 8A:
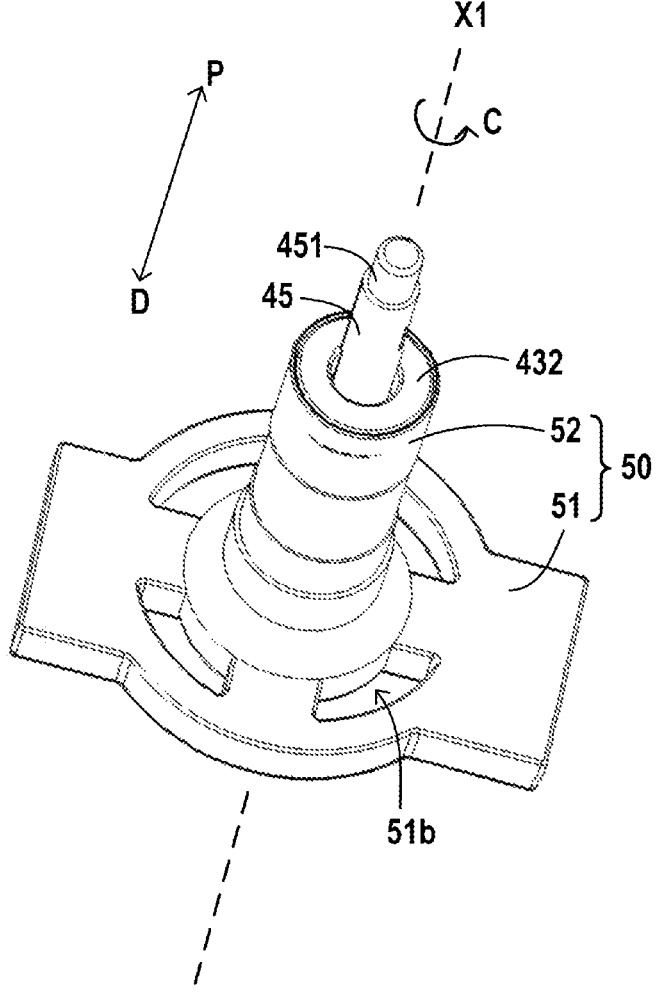
FIG. 8A is a near-side end view of the rotor shaft of the motor assembly in FIG. 5 in an assembled state.
Figure 8B:
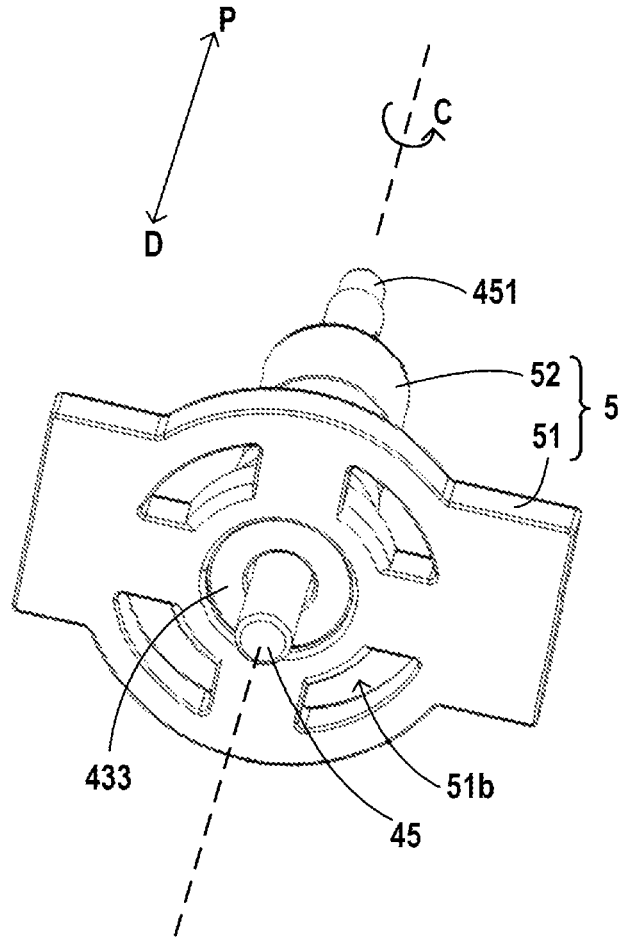
FIG. 8B is a far-side end view of the rotor shaft of the motor assembly in FIG. 5 in an assembled state.
Figure 9:
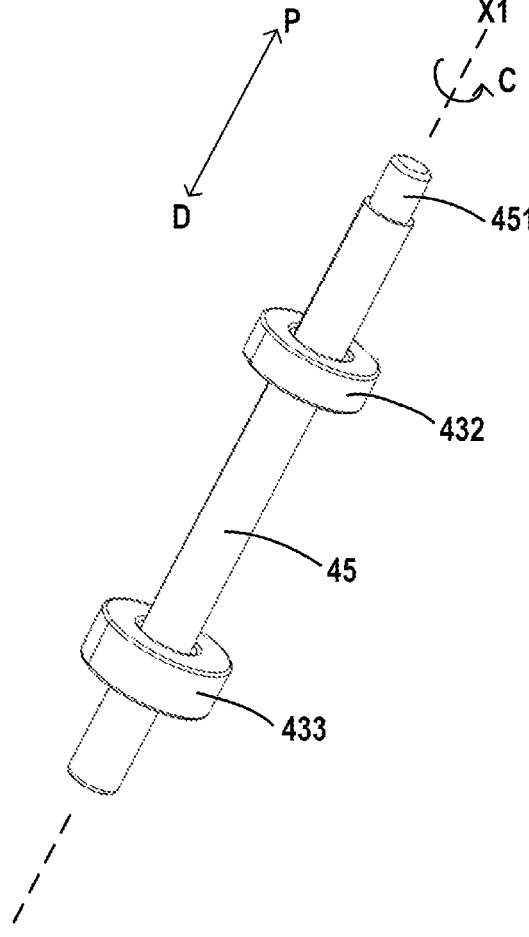
FIG. 9 is a schematic drawing of the combination of the rotor shaft and bearings in FIG. 8A—8B.

Continuing to refer to FIGS. 8A-9, bearings are installed in the first through-hole 51a of the motor support 50, to accommodate the rotor shaft 45 rotatably in the first through-hole.

FIGS. 8A and 8B show the assembled state of the motor assembly; the motor assembly mainly comprises the motor support 50 and the motor 40. FIG. 8A is viewed from the near-side end; FIG. 8B is viewed from the far-side end. Referring to FIG. 8A, a second bearing 432 is provided at a nearest-end part of the first through-hole 51a of the motor support 50 (defined by a nearest-end part of the second part 52), the outer diameter of the second bearing 432 matching the diameter of the part of the first through-hole 51a where it is located. Referring to FIG. 8B, a third bearing 433 is provided at a farthest-end part in the first through-hole 51a of the motor support 50 (defined by the part where the second part 52 and the first part 51 are joined together), the outer diameter of the third bearing 433 matching the diameter of the part of the first through-hole 51a where it is located.

The second bearing 432 and third bearing 433 enable the rotor shaft 45 of the motor 40 to pass through the motor support 50 rotatably. The second bearing 432 and third bearing 433 can prevent wear to the motor support 50 caused by high-speed rotation of the rotor shaft 45, and can also reduce resistance to rotation of the rotor shaft 45. In view of the fact that the output end of the rotor shaft 45 is located at the far-side end thereof, where vibration levels might be higher and wear is more likely, the size of the third bearing 433 may be set slightly larger, i.e. the outer diameter of the third bearing 433 may be slightly larger than the outer diameter of the second bearing 432. Correspondingly, the diameter of the first through-hole 51a at the farthest end of the first through-hole 51a may be slightly larger than the diameter of the first through-hole 51a at the nearest end.

Referring to FIG. 9, in this embodiment, bearings are only provided at the nearest-end part and the farthest-end part of the first through-hole respectively; this configuration can reduce wear and rotational resistance while avoiding an excessive weight increase, thus ensuring that the machine as a whole is lightweight. In other embodiments which are not shown, the degree of wear that might be caused by rotation of the rotor shaft may be taken into account, to suitably increase or decrease the number of bearings provided. For example, in one embodiment, only one bearing may be provided in the first through-hole of the motor support; this bearing may be located at a middle position in the direction of the motor axis, and preferably has a larger axial size. Alternatively, in one embodiment, two or more bearings may be provided in the first through-hole of the motor; the two or more bearings are preferably arranged at equal intervals in the direction of the motor axis.

Figure 5:
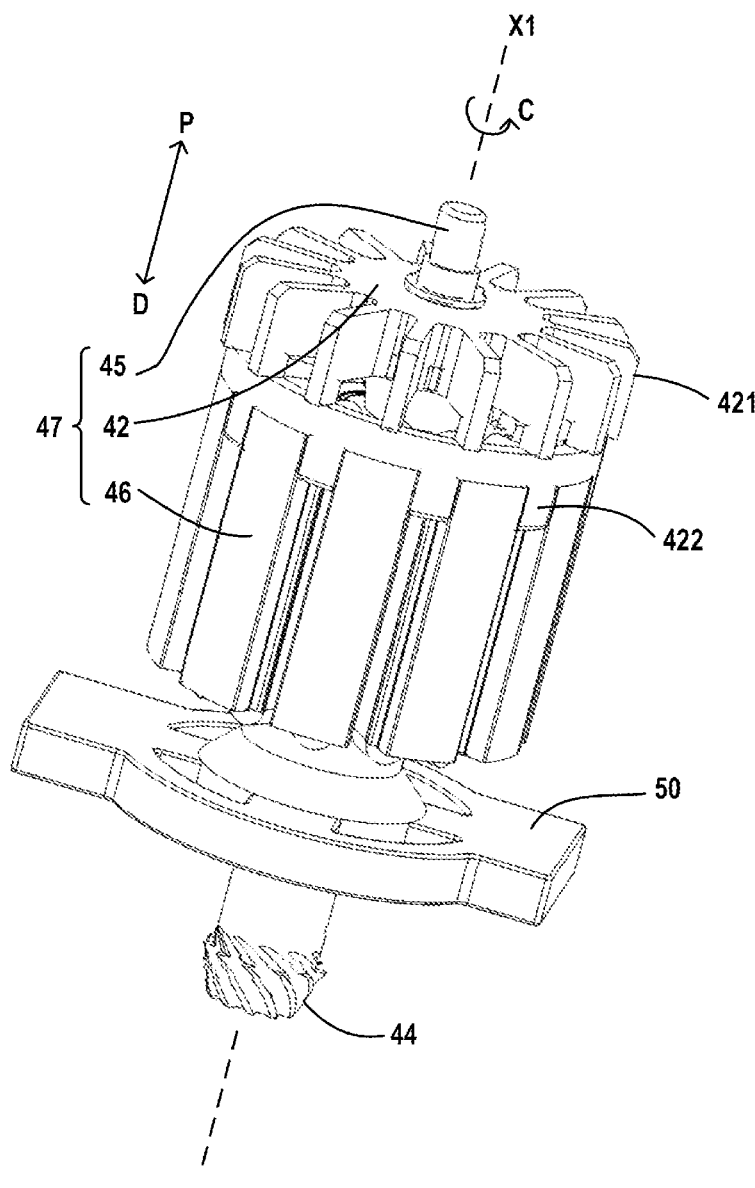
FIG. 5 is a three-dimensional schematic drawing of the combination of the motor and the motor support in FIG. 4, with a motor casing of the motor and a bearing at the near-side end removed.
Figure 6:
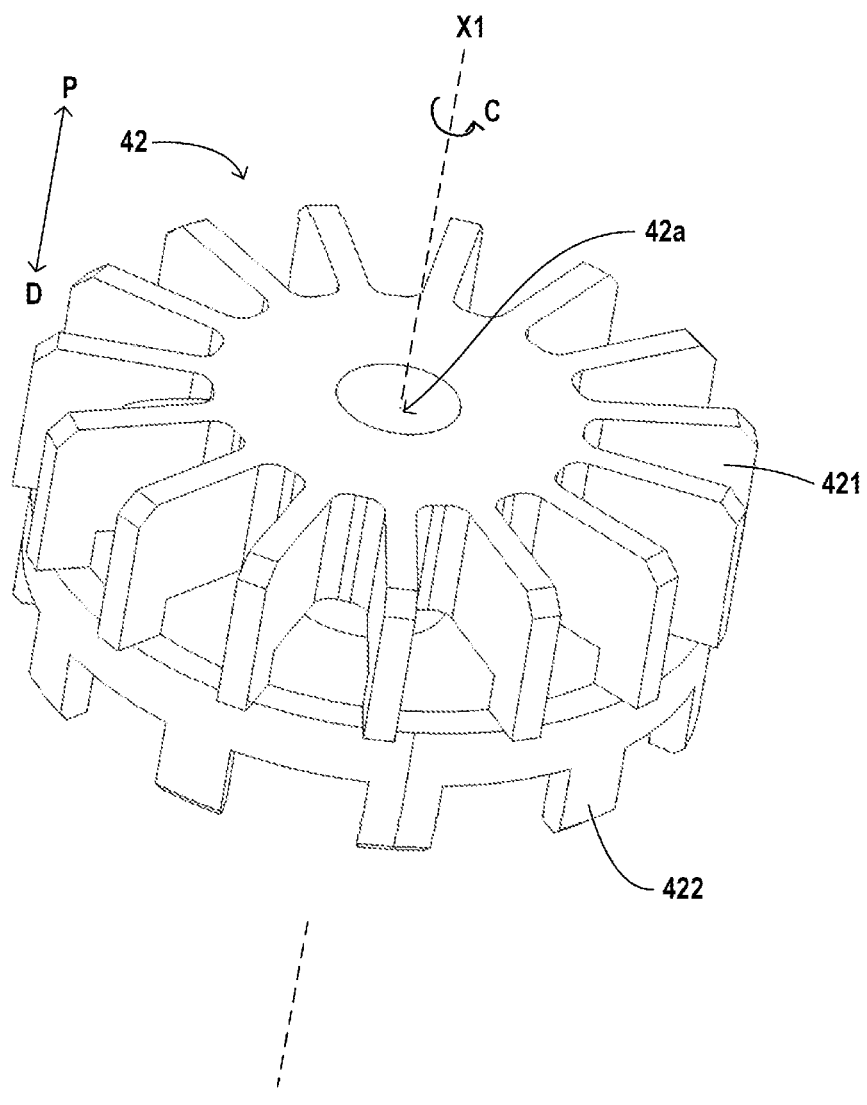
FIG. 6 is a three-dimensional schematic drawing of the rotation conduction component in FIG. 5.
Figure 7:
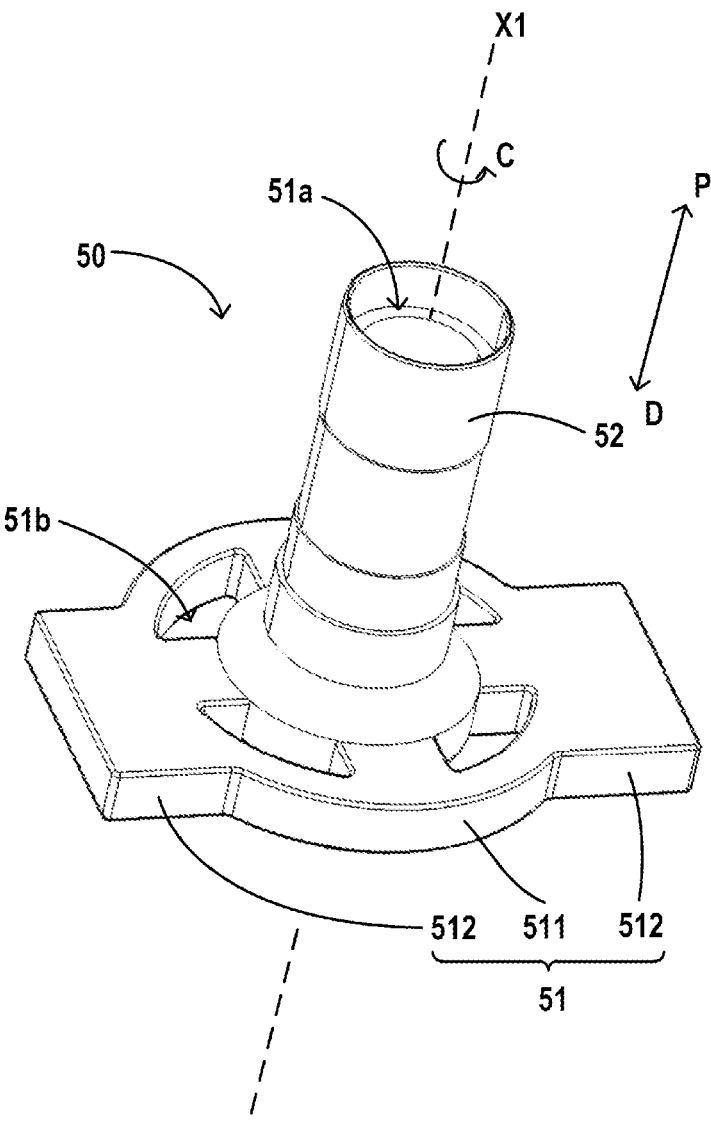
FIG. 7 is a three-dimensional schematic drawing of the motor support in FIG. 5.

This embodiment also has some preferred configurations with respect to the rotor of the motor 40. For example, referring to FIG. 5, the motor 40 in this embodiment is provided with a rotation conduction component 42 at the near-side end of the body thereof, the rotation conduction component being fixed (i.e. engaged in such a way as to be incapable of relative rotation) to both the rotor shaft 45 and the body 46 of the rotor in the circumferential direction C. In FIG. 5, the first bearing 43 and a motor casing 41 of the motor 40 (shown in FIG. 4) have been removed, to better show the internal structure of the motor 40. The rotation conduction component 42 is fixed to the body 46 of the rotor in the rotation direction for example by a manner of engagement achieved by teeth 422, which are shown in the figure and protrude in a direction parallel to the axis X1. It will be understood that the circumferential direction C is the rotation direction. In this embodiment, the body 46 of the rotor, the rotation conduction component 42 and the rotor shaft 45 rotate together, forming the rotor 47 in this embodiment. The detailed structure of the rotation conduction component 42 is shown in FIG. 6. It can be seen from FIG. 6 that the rotation conduction component 42 is provided with a rotor shaft through-hole 42a, and the rotor shaft 45 can pass through the rotor shaft through-hole 42a.

Furthermore, multiple fan blades 421 are provided on the rotation conduction component 42, the multiple fan blades being disposed around the rotor shaft 45, i.e. arranged in the circumferential direction C, each fan blade 421 extending in a radial direction in relation to the axis X1 of the motor 40. The fan blades 421 are provided to enable pumping of airflow while the motor 40 is running, such that the flowing airflow can cool electronic or mechanically operating components in the housing 10.

To enable gas to flow along a predetermined path under guidance, a gas inlet 101 and a gas outlet 102 are provided at specific positions of the housing 10. Returning to FIG. 1, the gas inlet 101 is configured to be close to the far-side end of the motor 40, and the gas outlet 102 is configured to be close to the near-side end of the motor 40. Another gas outlet 102 may preferably be provided symmetrically in the other half of the housing 10 which is symmetrical, in a direction D3 (shown in FIG. 2), with the part of the housing 10 shown in FIG. 1. Specifically, in this embodiment, the gas inlet 101 is positioned at the side of the first part 51 of the motor support 50 that faces away from the motor 40, so that the airflow that is to flow through the motor 40 needs to pass through the second through-hole 51b in the first part 51 in order to enter the motor 40. More preferably, the gas inlet 101 is also close to the PCB 70, so that when flowing in, the gas can flow through the PCB 70 first and then flow through the motor 40.

It is known that gas will be rapidly heated when flowing through the motor 40 running at high speed; to prevent such hot airflow from mixing with cold airflow that has just been sucked into the housing 10, a separating rib 104 is also provided in the housing 10 in this embodiment. The separating rib 104 is formed on an inner wall of the housing 10 and located between the gas inlet 101 and the gas outlet 102, to hermetically separate spaces in the housing 10; the approximate position of the separating rib 104 is marked with a dotted line in FIG. 3. In this embodiment, the separating rib 104 is positioned at the far-side end of the motor 40, specifically at one side of the motor support 50 in the far-side direction D. In other embodiments which are not shown, the separating rib may also be positioned between the far-side end and the gas outlet, thereby ensuring that hot airflow that has flowed through the motor cannot flow back, and can only be discharged to the outside through the gas outlet 102.

It will be understood that the path of extension of the separating rib 104 can cut off other unnecessary airflow circulation paths. The separating rib 104 is for example in the form of a rib plate. Preferably, the path of extension of the separating rib 104 may be formed in a U-shape as shown in FIG. 3; the recess of the U-shape faces towards the near-side end of the motor 40, and the motor support 50 is positioned in the recess in a size-fitted manner.

Due to the arrangement positions of the gas inlet 101 and gas outlet 102 on the housing 10, the presence of the separating rib 104 and the sucking action of the fan blades 421 of the motor 40, airflow will flow through the interior of the housing 10 along a predetermined path during operation of the handheld electric tool 100. Specifically, referring to FIGS. 1 and 3 at the same time, driven by the rotary action of the fan blades 421, airflow is sucked in through the gas inlet 101 and sequentially flows through the PCB 70, the second through-hole 51b in the motor support 50, and the motor 40, finally being discharged through the gas outlet 102. Such airflow can be used to cool the PCB 70 and the motor 40 at the same time.

Since a structure capable of cooling the PCB 70 is already present, there is no need to additionally provide a dedicated cooling means for the PCB 70 in the handheld electric tool 100. Of course, optionally, a heat dissipating plate 71 for the PCB 70 may also be simultaneously provided, to improve the result in terms of cooling the PCB 70.

This embodiment also provides a preferred motor arrangement angle. Specifically, referring to FIG. 3, the motor region 12 is an axially symmetric structural body, for example having the profile of part of a cuboid. The motor 40 is arranged such that the axis X1 of the motor 40 deviates from an axis of symmetry X2 of the motor region 12, i.e. an angle $\alpha$ greater than 0° is formed between the axis X1 of the motor 40 and the axis of symmetry X2 of the motor region 12. Preferably, the angle $\alpha$ is 10°-60°. More preferably, the angle is 20°-45°. Further preferably, the angle is 20°-30°. Such an angular setting makes it easier to arrange another component in a region close to the motor 40 in the housing 10, to increase the rate of use of space inside the housing 10, so that the handheld electric tool 100 can be made smaller with a lightweight body.

Moreover, compared with a conventional design in which the motor axis X1 and the axis of symmetry X2 are parallel or coincide, this embodiment enables the motor region 12 of the housing 10 to have a smaller length in the direction of the axis of symmetry X2.

For example, the PCB 70 may be arranged close to the motor 40. Specifically, the motor region 12 of the housing 10 has a characteristic housing part 121 parallel to the axis of symmetry X2; the distance between the characteristic housing part 121 and the near-side end of the motor 40 is less than the distance between the characteristic housing part 121 and the far-side end of the motor 40, so that space can be left for the PCB 70 at the position of the far-side end of the motor 40, to allow the PCB 70 to be partially located between a supporting member of the motor 40 and the characteristic housing part 121.

At the same time, in a more rational spatial arrangement, the transmission mechanism 60 may be disposed in the central region 13 of the housing 10; the transmission mechanism 60 is for example a gear transmission mechanism 60, and the output end 44 of the rotor shaft 45 of the motor 40 is meshed with the transmission mechanism 60 by gears, in order to output movement to the working member 20 via the transmission mechanism 60. The handheld electric tool 100 is for example a chainsaw, and the working member 20 is for example a cutting saw, which comprises a carrying body 21, for example a saw plate, and a saw chain 22 which is supported by the carrying body 21 and capable of turning around the carrying body 21; under the driving action of the transmission mechanism 60, the saw chain performs rotary cutting. Alternatively, the working member may comprising a cutting blade, and the transmission mechanism may be configured to be able to output reciprocating linear motion, to drive the cutting blade to extend and retract at high speed in order to perform cutting. In some embodiments, the handheld electric device may be a handheld nailing device, and the working member may be a firing member for firing wedges, nails, etc.; in some embodiments, the handheld electric device may be a handheld electric drill, and the working member may comprise a structure such as a drill bit.

This embodiment further provides some preferred configurations with respect to a guard 30 for shielding the working member 20; the guard 30 projects from the housing 10 and partially covers the working member 20. Referring to FIGS. 1 and 2, this embodiment establishes a Cartesian coordinate system for the engaged parts of the guard 30 and the housing 10; a first direction D1, a second direction and the third direction D3 are orthogonal in space. The second direction D2 is substantially parallel to a top face of the guard 30; the housing 10 has a pair of clamping structures 103 which are spaced apart from one another in the third direction D3, and the guard 30 is pivotably clamped between this pair of clamping structures 103. In this embodiment, in a projection plane defined by the first direction D1 and the second direction D2, the guard 30 and the pair of clamping structures 103 of the housing 10 have a region of overlap.

Preferably, the handheld electric tool 100 is configured to enable the guard 30 to freely pivot away from the working member 20 relative to the pair of clamping structures 103, so as to allow the guard 30 to be pushed up by an object to be cut during operation of the handheld electric tool 100. Such a configuration makes the engagement between the guard 30 and the housing 10 both secure and flexible, such that the guard 30 cannot easily fall off the housing 10, and allows the guard 30 to be pushed up naturally by a target object during a job, with no need for the user to open the guard 30 manually.

Likewise preferably, the combination of the guard 30 and the working member 20 is configured to be able to move as a unit in the second direction D2 relative to the housing 10, so that the working member 20 can have different lengths of outward extension; or the combination of the guard 30 and the working member 20 can be replaced as a unit with another set of a guard and a working member having a different length.

A motive power source of the handheld electric tool 100 in this embodiment may be a battery installed in the gripping region 11; the battery may be a removable disposable battery or a rechargeable battery. Of course, the handheld electric tool 100 may also be designed to have an electric interface or a USB interface, to acquire a motive power source from the outside.

It will be understood that the preferred embodiments above and the structures shown in FIGS. 1-9 are all exemplary, and those skilled in the art could make some alterations thereto and replacements therein. For example, the second part of the motor support could have a structure other than a tubular structure, as long as it can be fixed relative to the stator of the motor; the housing could have other shapes and is not necessarily clearly divided into a number of regions; and the fan blades provided on the motor could be omitted, or replaced with another structure capable of being used to pump airflow. These alterations to the preferred embodiments above and these replacements therein should all be understood as being embodiments provided by the present invention too.

The present invention further provides a motor assembly comprising a motor and a motor support; the motor assembly may be produced and sold independently of the handheld electric tool. All descriptions in the preferred embodiments above that relate to the motor, the motor support, and structures such as the bearings which are installed in the motor support and used to support the motor, should be identified as being embodiments of a motor assembly provided in the present invention.

The handheld electric tool provided in the present invention can prevent excessive transmission of motor vibration to the housing while also making the overall structure of the trimmer smaller and more lightweight. Furthermore, the handheld electric tool of the present invention also enables airflow to be sucked into the interior of the housing and cool internal components of the housing when the motor is operating, and cold airflow being sucked in cannot easily mix with hot airflow that has flowed through the motor. Additionally, the handheld electric tool is also configured such that the engagement between the guard of the working member and the housing is both secure and flexible, such that the guard cannot easily fall off the housing, and allows the guard to be pushed up naturally when cutting an object to be cut, with no need for the user to open the guard manually.

The above description of various embodiments of the present invention are provided to a person skilled in the art for descriptive purposes. It is not intended that the present invention be exclusively or limited to a single disclosed embodiment. As above, those skilled in the field of the above teaching will understand various alternatives and variants of the present invention. Thus, although some alternative embodiments have been specifically described, those skilled in the art will understand, or develop with relative ease, other embodiments. The present invention is intended to include all alternatives, modifications and variants of the present invention described here, as well as other embodiments which fall within the spirit and scope of the present invention described above.

The invention claimed is:

1. A handheld electric tool, the handheld electric tool comprising:
   a housing defining an installation opening, a gas inlet, and a gas outlet, the housing comprising a separating rib extending from an inner wall of the housing between the gas inlet and the gas outlet;
   a working member, installed at the installation opening of the housing and protruding outward from the housing;

a motor disposed in the housing, the motor having a far-side end close to the working member and a near-side end remote from the working member; and a motor support, disposed in the housing comprising:

a first part, positioned at the far-side end of the motor and fixedly connected to the housing, and a second part, extending from the first part into an interior of the motor and fixedly connected to a stator of the motor;

wherein the second part is provided with a first through-hole for a rotor shaft of the motor to pass through, and an output end of the rotor shaft extends through the first through-hole and drives the working member to move;

wherein the first part defines one or more second through-holes in fluid communication with the gas inlet and the gas outlet for airflow to pass through;

wherein the gas inlet is close to the far-side end and the gas outlet is close to the near-side end; and wherein the motor is configured such that during operation thereof, airflow can be sucked in through the gas inlet, flow through the one or more second through-holes in the motor support and the motor and finally be discharged through the gas outlet, driven by a rotary action of fan blades arranged around the rotor shaft.

2. The handheld electric tool according to claim 1, wherein the first part of the motor support is formed as a plate-like structure, and an engagement slot is provided in an inner wall of the housing, the plate-like structure being correspondingly held in the engagement slot.

3. The handheld electric tool according to claim 1, wherein the motor is an external-rotor motor, and the second part is formed as a tubular structure engaged with a circumferential inner wall of the stator, the tubular structure defining the first through-hole.

4. The handheld electric tool according to claim 1, wherein one end of a rotor of the motor is provided with a rotation conduction component arranged around the rotor shaft, the rotation conduction component being connected to both the rotor shaft and a body of the rotor in such a way as to be incapable of relative rotation.

5. The handheld electric tool according to claim 1, wherein a bearing is installed in the first through-hole, the bearing supporting the rotor shaft rotatably.

6. The handheld electric tool according to claim 5, wherein a nearest-end part and a farthest-end part in the first through-hole are each provided with one said bearing.

7. The handheld electric tool according to claim 1, wherein the rotor shaft has a near-side extremity extending out of a body of the motor, at least one bearing being installed at the near-side extremity.

8. The handheld electric tool according to claim 1, wherein the separating rib defines a recess having a U-shape, the recess of the U-shape facing towards the near-side end of the motor, and the motor support being accommodated in the recess in a size-fitted manner.

9. The handheld electric tool according to claim 1, wherein the gas inlet is positioned at the side of the first part of the motor support that faces away from the motor, and wherein the second through-holes extend parallel to the rotor shaft.

10. The handheld electric tool according to claim 1, wherein the handheld electric tool further comprises a PCB which is disposed in the housing and close to the motor, the gas inlet being positioned so as to be simultaneously close to the PCB, so that sucked-in gas flows through the PCB and then through the motor.

11. The handheld electric tool according to claim 1, wherein the housing comprises a motor region for accommodating the motor and a gripping region for a user to grasp, the motor region being an axially symmetric structural body, wherein an axial direction of the rotor shaft of the motor deviates from an axis of symmetry of the motor region.

12. The handheld electric tool according to claim 11, wherein an angle ($\alpha$) between the axial direction of the rotor shaft of the motor and the axis of symmetry of the motor region is 10°-60°.

13. The handheld electric tool according to claim 11, wherein the motor region of the housing has a characteristic housing part parallel to the axis of symmetry, a distance between the characteristic housing part and the near-side end of the motor being less than the distance between the characteristic housing part and the far-side end of the motor, and the handheld electric tool comprises a PCB, the PCB being positioned so as to be partially located between a supporting member of the motor and the characteristic housing part.

14. The handheld electric tool according to claim 11, wherein the housing further comprises a central region, wherein the motor region, the gripping region and the working member are arranged so as to extend outwards around the central region, and a transmission mechanism for transmitting an output of the motor to the working member is provided in the central region.

15. The handheld electric tool according to claim 1, wherein the handheld electric tool is a handheld trimming device; and the working member is a cutting member.

16. The handheld electric tool according to claim 15, wherein the handheld electric tool further comprises a guard which projects from the housing and partially covers the working member, and the housing has a pair of clamping structures located at the opening, the guard being pivotably clamped between the pair of clamping structures.

17. The handheld electric tool according to claim 16, wherein the handheld electric tool is configured to enable the guard to freely pivot away from the working member relative to the pair of clamping structures, so as to allow the guard to be pushed up by an operation target object during operation of the handheld electric tool.

18. The handheld electric tool according to claim 1, wherein the first part comprises a circular plate and two wing plates extending from the circular plate, wherein the two wing plates are arranged symmetrically about the circular plate, and wherein the circular plate defines the one or more second through-holes.

19. A motor assembly for a handheld electric tool, the motor assembly comprising:

a motor comprising a far-side end close to a motive power output end of the motor and a near-side end remote from the motive power output end; and a motor support, comprising:

a first part, positioned at the far-side end of the motor and comprising at least one fixed characteristic, and a second part, extending from the first part into an interior of the motor and fixedly connected to a stator of the motor;

wherein the second part is provided with a first through-hole for a rotor shaft of the motor to pass through, the rotor shaft passing through the first through-hole, and a far-side extremity and a near-side extremity of the rotor shaft both extending out of a body of the motor assembly;

wherein the first part defines one or more second through-holes extending parallel to the rotor shaft for airflow to pass through; and wherein the first part comprises a circular plate and two wing plates extending from the circular plate, the circular plate defining the one or more second through-holes.

20. The motor assembly according to claim 19, wherein the first part of the motor support is formed as a plate-like structure.

21. The motor assembly according to claim 19, wherein the motor is an external-rotor motor, and the second part is formed as a tubular structure engaged with a circumferential inner wall of the stator, the tubular structure defining the first through-hole.

22. The motor assembly according to claim 19, wherein one end of a rotor of the motor is provided with a rotation conduction component arranged around the rotor shaft, the rotation conduction component being connected to both the rotor shaft and a body of the rotor in such a way as to be incapable of relative rotation.

23. The motor assembly according to claim 19, wherein a bearing is installed in the first through-hole, the bearing supporting the rotor shaft rotatably.

24. The motor assembly according to claim 23, wherein a nearest-end part and a farthest-end part in the first through-hole are each provided with one said bearing.

25. The motor assembly according to claim 19, wherein at least one bearing is installed on the near-side extremity of the rotor shaft that projects from a body of the motor.

* * * * *